(12) United States Patent
Hartwell

(10) Patent No.: US 9,061,772 B1
(45) Date of Patent: Jun. 23, 2015

(54) DUAL MODE LIGHTS AUTOMATIC INTENSITY CONTROL

(75) Inventor: Mark Alan Hartwell, Tulalip, WA (US)

(73) Assignee: THE BOEING COMPANY, Chicago, IL (US)

( * ) Notice: Subject to any disclaimer, the term of this patent is extended or adjusted under 35 U.S.C. 154(b) by 514 days.

(21) Appl. No.: 13/493,987

(22) Filed: Jun. 11, 2012

(51) Int. Cl.
*B60Q 1/14* (2006.01)
*B64D 47/06* (2006.01)

(52) U.S. Cl.
CPC ........................................ *B64D 47/06* (2013.01)

(58) Field of Classification Search
CPC ....................................................... B64D 47/06
USPC ...................... 315/77; 362/470; 340/980–982; 250/214 AL
See application file for complete search history.

(56) References Cited

U.S. PATENT DOCUMENTS

| | | | |
|---|---|---|---|
| 3,879,617 A * | 4/1975 | Faller | 307/10.8 |
| 6,559,777 B1 * | 5/2003 | Martin et al. | 340/981 |
| 7,663,506 B2 * | 2/2010 | Lundberg et al. | 340/945 |
| 7,999,698 B2 * | 8/2011 | Annati et al. | 340/945 |
| 8,454,212 B2 * | 6/2013 | Fabbri et al. | 362/470 |

OTHER PUBLICATIONS

United States Department of Defence MIL-STD 3009 (Lighting, Aircraft, Night Vision Imaging System (NVIS) Compatible) Issued Feb. 2, 2001.
SAE Aerospace Recommended Practice 5825 (Design Requirements and Test Procedures for Dual Mode Exterior Lights); Reissued Jun. 2002.
SAE Aerospace Recommended Practice 4392 (Lighting, Aircraft Exterior, Night Vision Imaging System (NVIS) Compatible); Issued Jun. 2002.
SAE Aerospace Recommended Practice 5452 (Night Vision Goggles (NVG) Compatible Lighting for Civil Aircraft); Revised Jun. 2006.

* cited by examiner

*Primary Examiner* — Kenneth B Wells
(74) *Attorney, Agent, or Firm* — Ameh IP; Lowell Campbell; Elahe Toosi

(57) ABSTRACT

A system and methods for automatic intensity control of dual mode lights are presented. An ambient light level is sensed on a first side of a vehicle to obtain a sensed ambient light level, and a light level of a light source on a second side of the vehicle opposite the first side is adjusted based on the sensed ambient light level.

18 Claims, 8 Drawing Sheets

DUAL MODE LIGHTS AUTOMATIC INTENSITY CONTROL

FIELD

Embodiments of the present disclosure relate generally to sensors. More particularly, embodiments of the present disclosure relate to optical infrared sensors.

BACKGROUND

Pilots flying an aircraft at night and using a night vision imaging system (NVIS) such as night vision goggles (NVGs) may have a field of view that is essentially mono-chromatic green. NVGs in use today are generally generation III, Type I and Class B/C (described in MIL-STD 3009). When pilots wearing NVGs view an approaching aircraft operating in a visible mode, both starboard and port position lights appear green. When not wearing NVGs, pilots would see a green color of a green starboard position light and a red color of a red port position light.

Because red and green position lights seen as red and green in a visible spectrum have different amounts of infrared (IR) content, the (visible light) red and green position lights, when viewed with NVGs in an infrared spectrum, also represent a difference. However, the difference is associated with apparent luminance or how bright the red and green position lights appear rather than a color difference. This apparent luminance is more correctly known as NVIS radiant intensity (NRI). NRI is defined as a radiometric energy of a light source integrated with a response curve of one or more NVGs.

SUMMARY

A system and methods for automatic intensity control of dual mode lights such as formation lights and/or position lights are presented. An ambient light level is sensed on a first side of a vehicle, and a light level of a formation light on a second side opposite of the first side of the vehicle is adjusted based on the ambient light level.

In this manner, in a case of position lights, embodiments of the disclosure allow trained pilots wearing NVGs to distinguish a direction of travel of remote covert aircraft that may be moving away or approaching.

In an embodiment, a method for automatic intensity control of dual mode lights senses an ambient light level on a first side of a vehicle to obtain a sensed ambient light level, and adjusts a light level of a light source on a second side opposite of the first side of the vehicle based on the sensed ambient light level.

In another embodiment, a non-transitory computer readable storage medium comprises computer-executable instructions for automatic intensity control of dual mode lights. The method executed by the computer-executable instructions senses an ambient light level on a first side of a vehicle to obtain a sensed ambient light level, and adjusts a light level of a light source on a second and opposite side of the vehicle based on the sensed ambient light level.

In a further embodiment, an automatic intensity control system for dual mode lights comprises at least one ambient light sensor and at least one light source. The ambient light sensor is coupled to a first side of a vehicle and senses an ambient light level on a first side of the vehicle to provide a sensed ambient light level. The light source is coupled to a second and opposite side of the vehicle and transmits a light level adjusted based on the sensed ambient light level.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, optical sensors, formation and position light sources, electronic circuits, electronic devices, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, automatically adjusting intensity of a dual mode light such as a formation and/or position light of aircraft for covert operation. Embodiments of the disclosure, however, are not limited to such aircraft dual mode light intensity setting applications, and the techniques described herein may also be utilized in other applications. For example but without limitation, embodiments may be applicable to bicycles, automobiles, ships, submarines, or other ground, air, and water vehicles that can be operated by an operator/user wearing night vision goggles (NVGs). Embodiments may also be applicable to portable devices carried by a user to automatically adjust intensity of light sources for covert operation.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
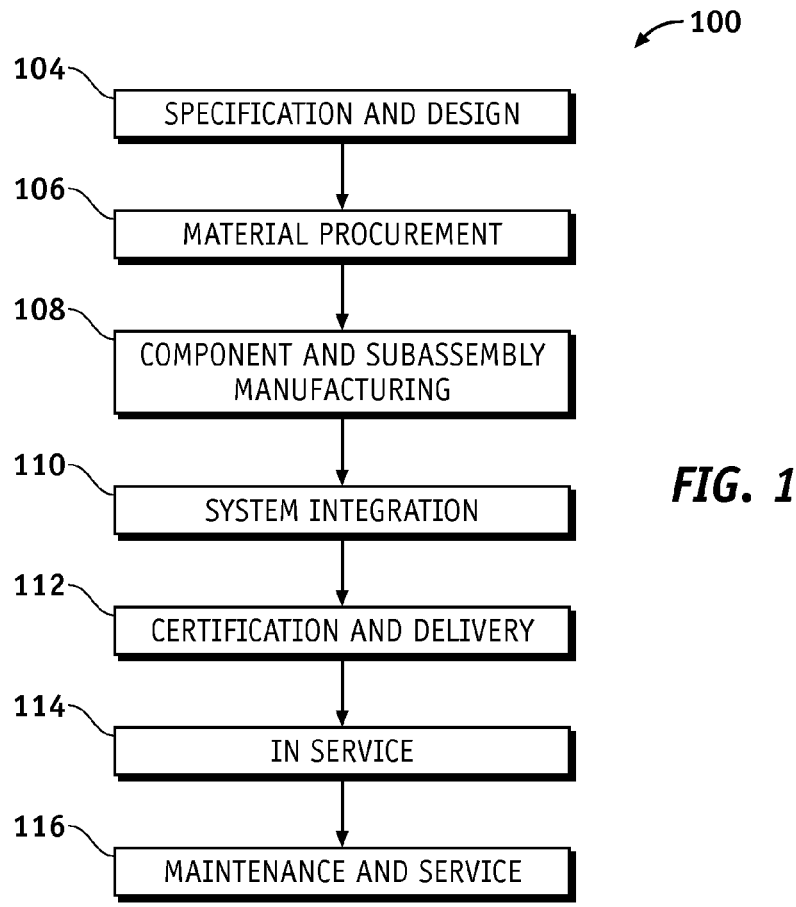
FIG. 1 is an illustration of a flow diagram of an exemplary aircraft production and service methodology.
Figure 2:
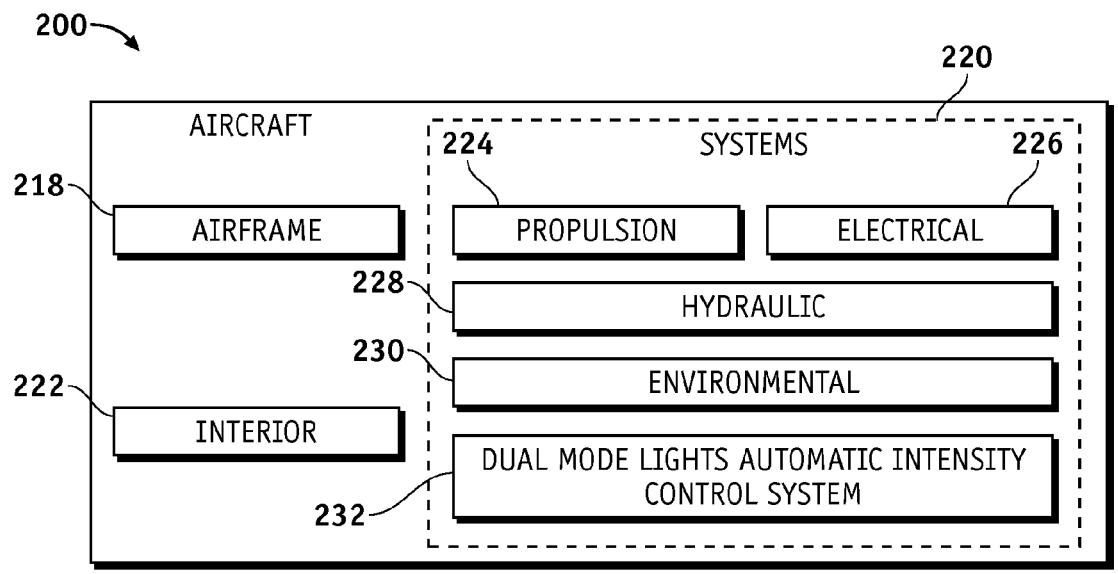
FIG. 2 is an illustration of an exemplary block diagram of an aircraft.

Referring more particularly to the drawings, embodiments of the disclosure may be described in the context of an aircraft manufacturing and service method 100 (method 100) as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220, and an interior 222. Examples of high-level systems 220 include one or more of a propulsion system 224, an electrical system 226, a hydraulic system 228, an environmental system 230, and a dual mode lights automatic intensity setting control system 232 for covert operation. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Trained pilots using NVGs to view night vision imaging system (NVIS) compatible position lights in visible mode may be able to distinguish a difference between port and starboard. A trained pilot using NVGs would identify a brighter forward facing position light as a port light and realize an aircraft is approaching. To confirm this, a pilot could lower the NVGs and view in visible light for color. This is an important situational awareness issue, because a pilot can determine that such a remotely positioned aircraft is approaching. Aft facing position lights are specified by government regulations to be aviation white. In visible mode, when an observer pilot views two white position lights on another aircraft, an observer pilot may understand that the remotely positioned aircraft is moving away. In such a situation, when an observer pilot is wearing NVGs two white aft facing position lights now appear green, but also appear to have a same intensity.

Hence, a trained observer pilot can still distinguish that the remotely positioned aircraft is moving away. When an aircraft is commanded to operate in a covert mode, visible position lights can be switched OFF or switched to infrared (IR). Other pilots operating in a same vicinity as a covert aircraft can see the covert aircraft if observer pilots are wearing NVGs and the remotely positioned aircraft has commanded position lights be switched to IR mode. However, situational awareness is impaired because port and starboard, forward and aft of the position lights could appear the same. A remotely positioned covert aircraft may be moving away or approaching, but that distinction may not be known by an observer pilot wearing NVGs.

Embodiments of the disclosure provide a means for viewing visible position lights in a visible operation mode with NVGs and viewing a covert infrared (IR) operation mode of the position lights with NVGs such that the position lights have a substantially same appearance in either operation mode when viewed at a same distance with NVGs.

Figure 3:
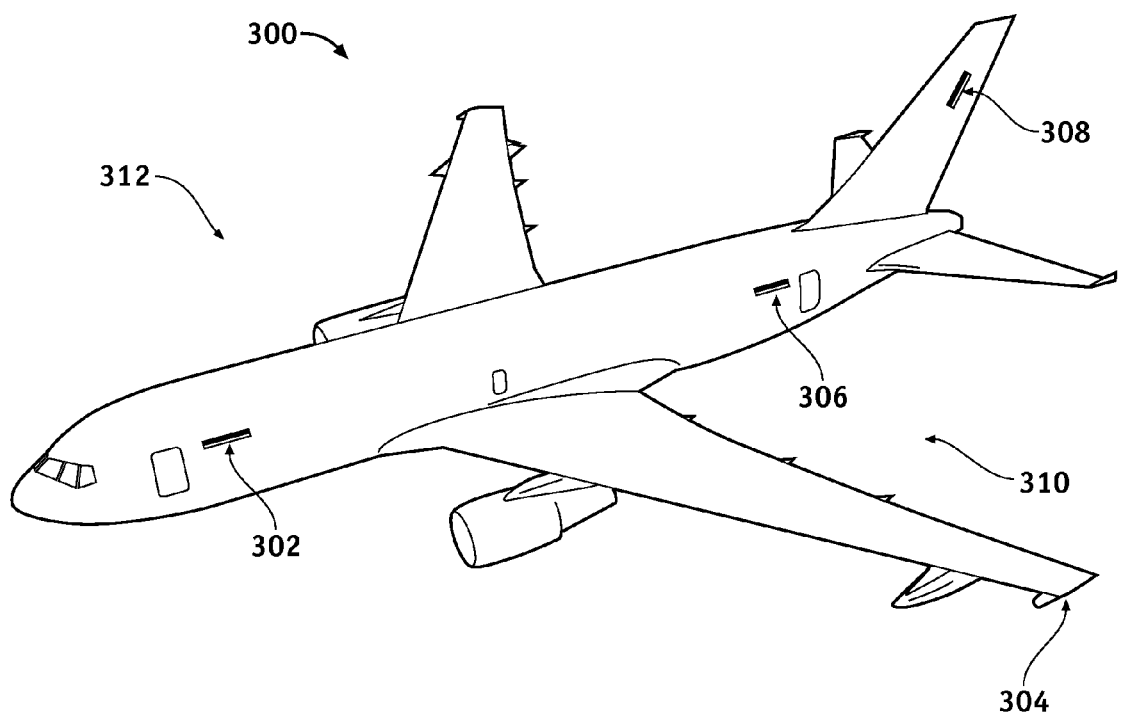
FIG. 3 is an illustration of an exemplary aircraft showing dual mode formation light sources.

FIG. 3 is an illustration of an exemplary aircraft 300 showing a forward fuselage dual mode formation light source 302, a wing tip dual mode formation light source 304, an aft fuselage dual mode formation light source 306, and a vertical stabilizer formation light source 308 for the port side 310. The starboard side 312 located on the opposite of the port side 310 comprises the same formation light source as the port side 310. Each of the dual mode formation light sources 302/304/306/308 comprise a visible light mode shown by a white strip and a covert light mode shown by a dark strip.

Figure 4:
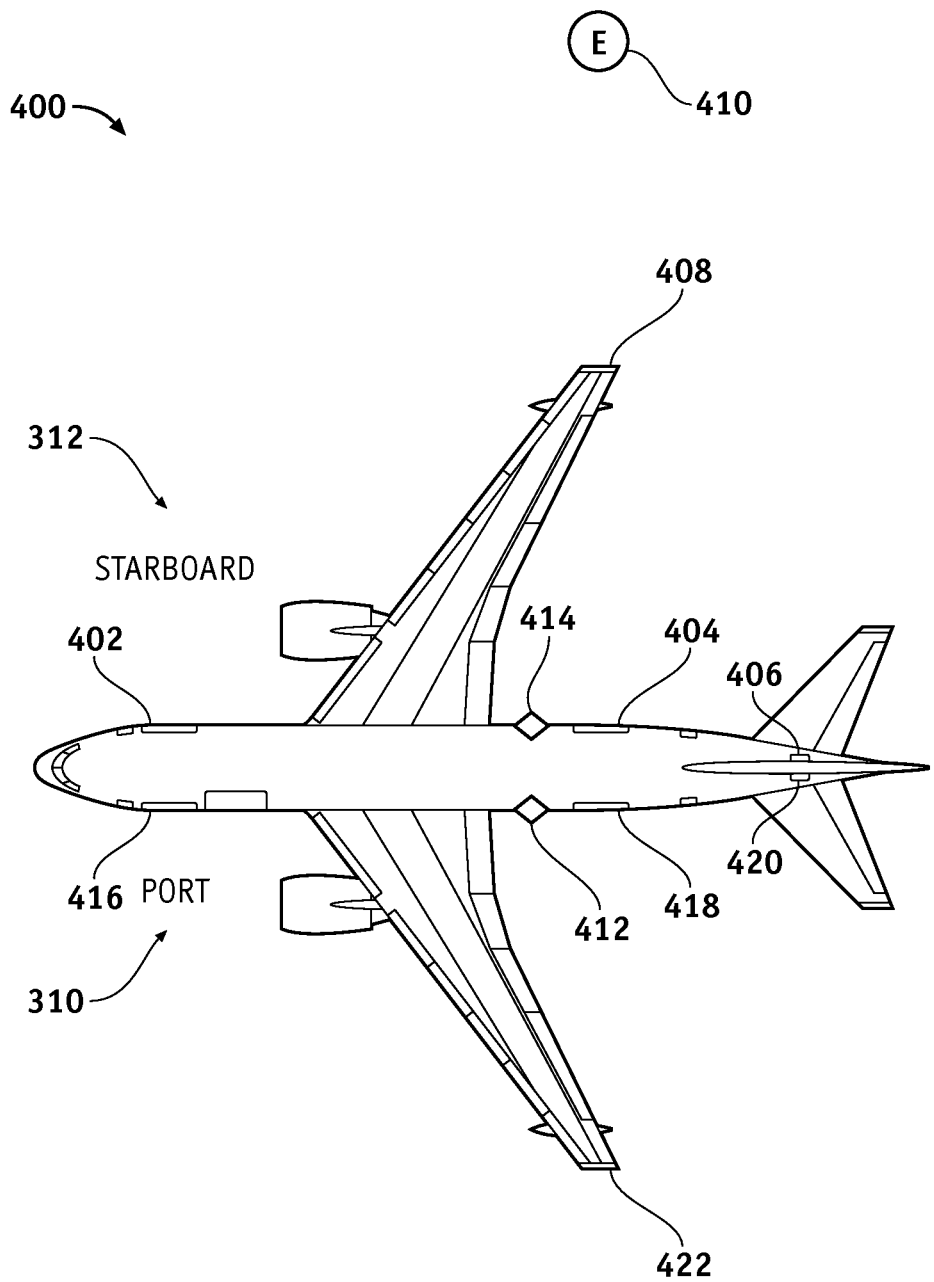
FIG. 4 is an illustration of an exemplary aircraft showing dual mode formation light sources and ambient sensors according to an embodiment of the disclosure.

FIG. 4 is an illustration of an exemplary aircraft 400 showing dual mode formation light sources 402/404/406/408 on the starboard side 312, dual mode formation light sources 416/418/420/422 on the port side 310, port side ambient light sensor 412, and starboard side ambient sensor 414 according to an embodiment of the disclosure. The port side ambient light sensor 412 looks outboard and controls the dual mode formation light sources 402/404/406/408 on the starboard side 312. Similarly, the starboard side ambient light sensor 414 looks outboard and controls the dual mode formation light sources 416/418/420/422 on the port side 310. The dual mode formation light sources 402/404/406/408 are adjusted such that an observer at a position 410 at the starboard side 312 can see uniform luminance. The starboard luminance level of the starboard side 312 is controlled by the ambient light detected by the port side ambient light sensor 412 located at the port side 310.

Dual mode exterior lights are comprised of two modes: 1) Visible and 2) Covert. Position light sources can be dual mode exterior light sources. Position light sources are used to identify aircraft at night for the purpose of reducing a risk of mid-air non-optimal proximity. Position light sources generally must meet all government specifications for chromaticity and intensity in visible mode, but are often specific to be compatible with night vision imaging system (NVIS) equipment, primarily night vision goggles (NVGs). The compatibility may be aimed at, for example, generation III NVGs. Often a term "NVIS Friendly" is used. "NVIS Friendly" may be defined as, for example, a visible light mode with reduced infrared (IR) content such that when the visible mode is viewed with NVGs, the NVGs do not "bloom" or wash out from excessive energy, but government chromaticity specifications are fulfilled.

A covert light mode (IR mode) for exterior lighting may be defined as, for example, not viewable by a dark-adapted, unaided eye at a distance greater than about 9 meters (about 30 feet), in a dark environment (e.g., less than about 10.8 lux (less than about 1.0 foot-candle) ambient illumination), and when a night vision imaging system (NVIS) is on the ground. For example, the covert light mode in many applications should generally be viewable by an NVIS such as an NVG at a substantially minimum distance of about 5.6 kilometers (about 3 NM) in the air, at night, with a three-quarter to full moon, and with all other system exterior lights off. A "lower hemisphere" is generally defined as, for example, not viewable by an NVIS equipped ground or aerial observer when the NVIS is directly overhead, straight and level, and at about 91 m (about 300 feet) to about 152 m (about 500 feet) away.

Figure 5:
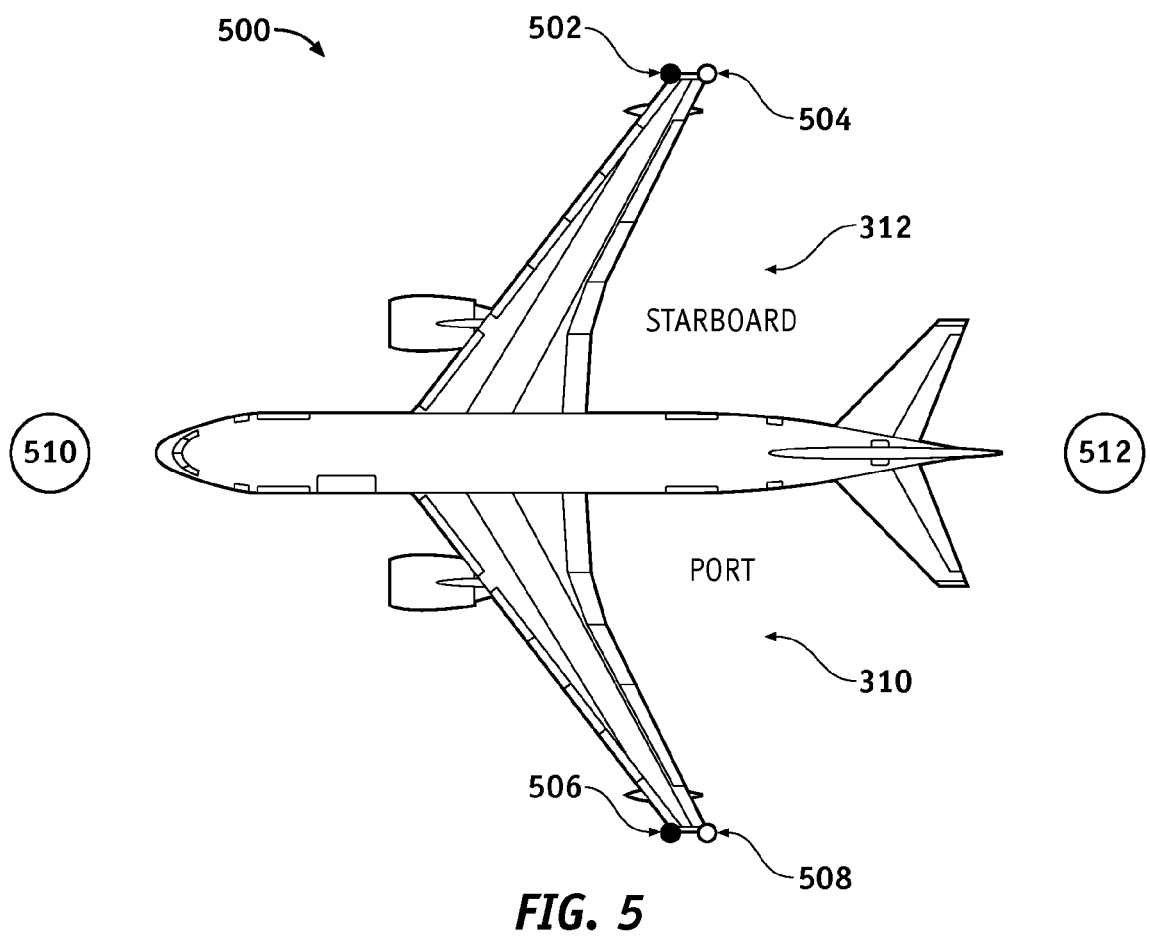
FIG. 5 is an illustration of an exemplary aircraft showing dual mode position light sources in visible light mode.

FIG. 5 is an illustration of an exemplary aircraft 500 showing dual mode position light sources 502/504/506/508 in visible light mode. In the example shown in FIG. 5, the dual mode position light sources 502/504/506/508 comprise a forward starboard position light source 502 which is an aviation green and is NVIS Friendly, an aft starboard position light source 504 which is an aviation white and is NVIS Friendly, a forward port position light source 506 which is an aviation red and is NVIS Friendly, and an aft port position light source 508 which is an aviation white and is NVIS Friendly. This configuration can be substantially compatible with government position lighting design parameters and also compatible with the use of NVGs.

An observer 510 wearing night vision goggles forward of the aircraft 500 can see the port position light source 506 on the port side 310 as bright and the starboard position light source 502 on the starboard side 312 as dim. An observer 512 wearing night vision goggles aft of the aircraft 500 can see the aft port position light source 508 on the port side 310 and the aft starboard light source 504 on the starboard side 312 as a same brightness.

Figure 6:
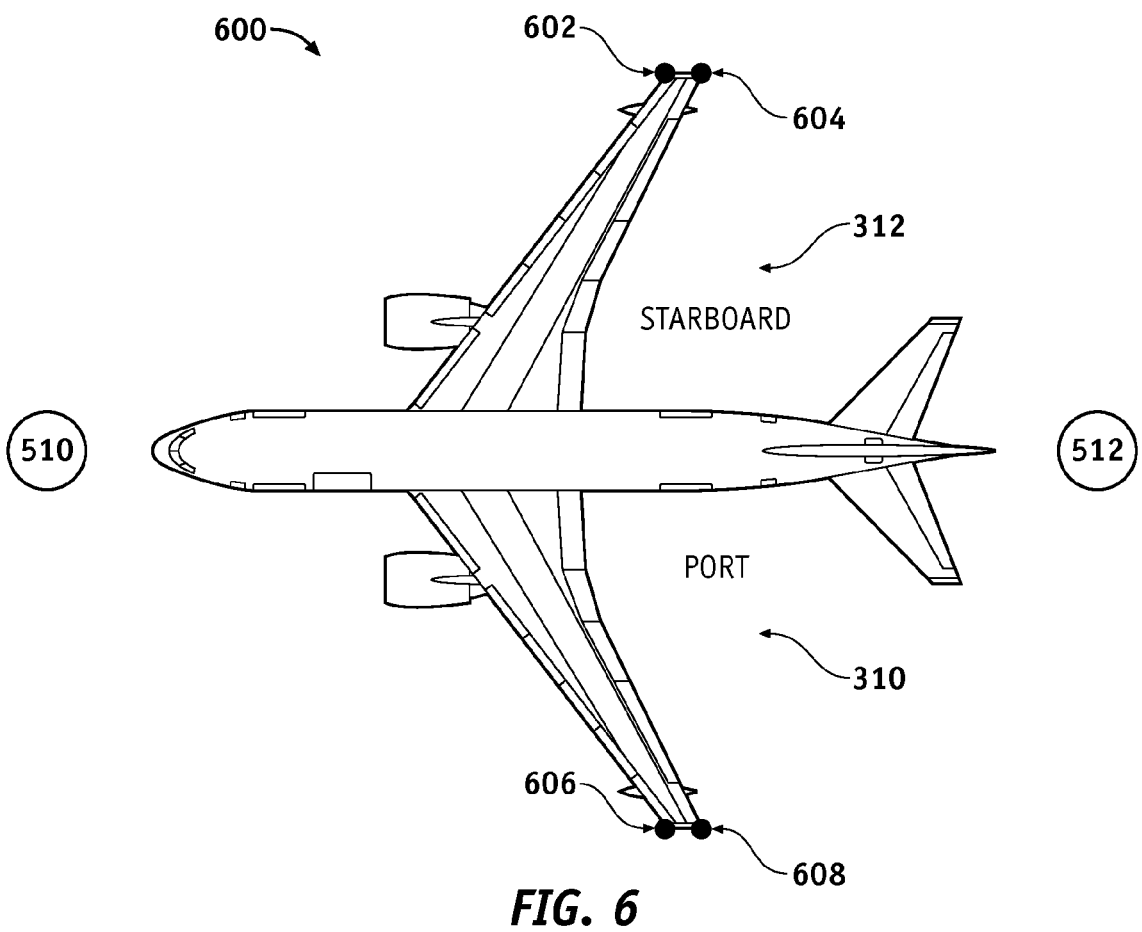
FIG. 6 is an illustration of an exemplary aircraft showing dual mode position light sources in a covert light mode.

FIG. 6 is an illustration of an exemplary aircraft 600 showing dual mode position light sources 602/604/606/608 in a covert light mode. In the example shown in FIG. 6, the dual mode position light sources 602/604/606/608 comprise a forward starboard position infrared light source 602, an aft starboard position infrared light source 604, a forward port position infrared light source 606, and an aft port position infrared light source 608. In this covert mode configuration, a remote observer 510 wearing NVGs forward of the aircraft 600 or a remote observer 512 aft of the aircraft 600 cannot distinguish whether the aircraft 600 is approaching or moving away, because the image appears the same.

The observer 510 wearing NVGs forward of the aircraft 600 can see the port position infrared light source 606 on the port side 310 and the starboard position infrared light source 602 on the starboard side 312 as the same brightness. The observer 512 wearing NVGs aft of the aircraft 600 can see the port position infrared light source 608 on the port side 310 and the starboard position infrared light source 604 on the starboard side 312 as the same brightness.

Figure 7:
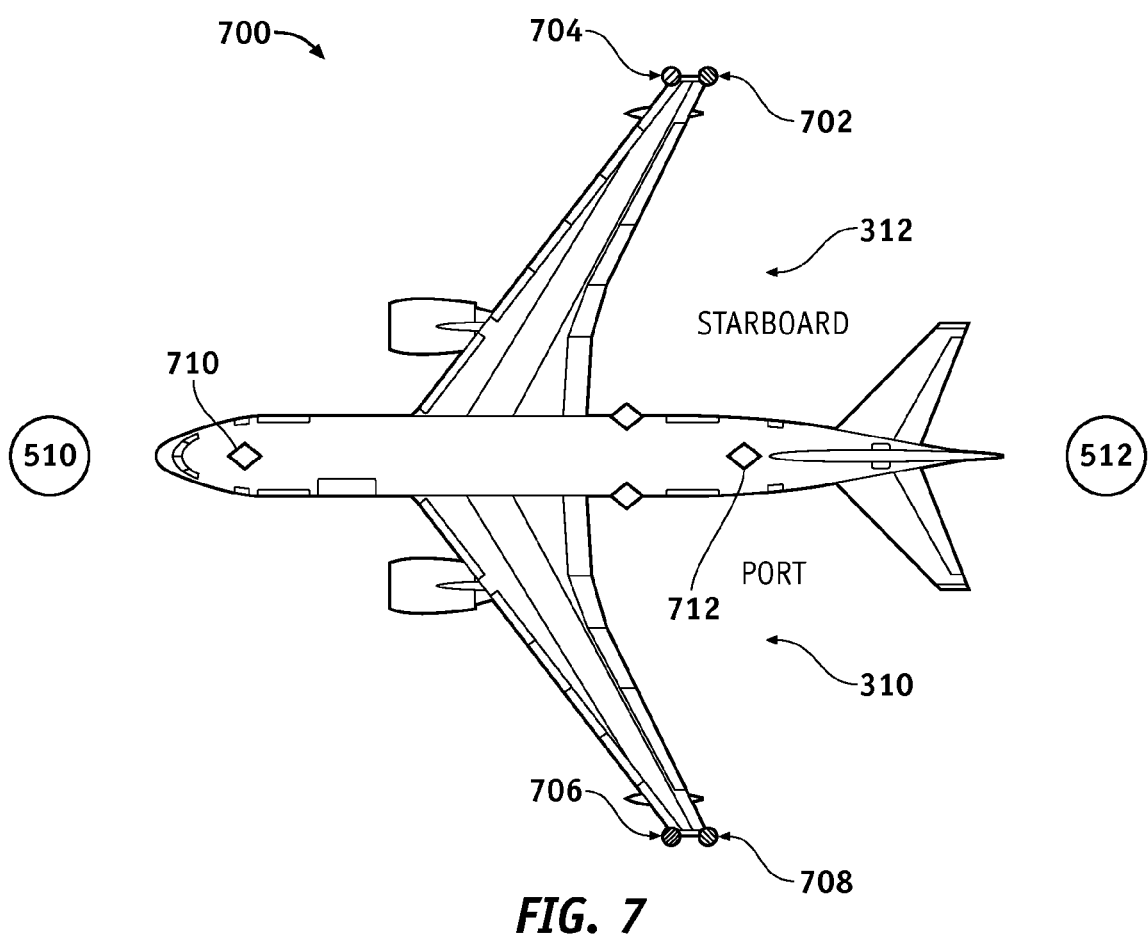
FIG. 7 is an illustration of an exemplary aircraft showing dual mode position light sources in a covert mode according to an embodiment of the disclosure.

FIG. 7 is an illustration of an exemplary aircraft 700 showing dual mode position light sources 702/704/706/708 in a covert light mode according to an embodiment of the disclosure. The dual mode position light sources 702/704/706/708 comprise an aft starboard position infrared light source 702, a forward starboard position infrared light source 704, a forward port position infrared light source 706, and an aft port position infrared light source 708.

A forward ambient light sensor 710 is configured to sense ambient light forward and control aft facing dual mode position light sources 702/708, and an aft ambient light sensor 712 is configured to sense ambient light aft and control forward facing dual mode position light sources 706/704.

In this covert light mode configuration a remote observer 510 forward the aircraft 700 or a remote observer 512 aft of the aircraft 700 can distinguish whether the aircraft 700 is approaching or moving away. The remote observer 510 forward or the remote observer 512 aft of the aircraft 700 wearing NVGs can see the same contrast difference that exists between the dual mode position light sources 702/704/706/708 (covert position lights) as would be observed by viewing NVIS friendly visible position lights with NVGs.

For example but without limitation, the aft starboard position infrared light source 702 and the aft port position infrared light source 708 may provide a substantially equal radiation intensity on wing tips of the aircraft 700.

For example but without limitation, the aft starboard position infrared light source 702 has a (a near infrared) night vision imaging system (NVIS) radiant intensity (NRI) value (aft starboard NRI value) substantially greater than an NRI value (forward starboard NRI value) of the forward starboard position infrared light source 704 at the starboard side 312, but less than an NRI value (forward port NRI value) of the forward port position infrared light source 706 at the port side 310.

For example but without limitation, the forward starboard position infrared light source 704 at the starboard side 312 has an NRI value substantially less than an NRI value of the forward port position infrared light source 706 at the port side 310.

For example but without limitation, the forward port position infrared light source 706 has an NRI value substantially greater than NRI value of the forward starboard position infrared light source 704 at the starboard side 312.

For example but without limitation, the aft port position infrared light source 708 at the port side 310 has an NRI value (aft port NRI value) substantially greater than an NRI value of the forward starboard position infrared light source 704 at the starboard side 312 but less than the forward port position infrared light source 706 at the port side 310.

The observer 510 wearing NVGs forward of the aircraft 700 can see the port forward position infrared light source 706 on the port side 310 as much brighter than the starboard forward position infrared light source 704 on the starboard side 312. The observer 512 wearing NVGs aft of the aircraft 700 can see the port position infrared light source 708 on the port side 310 and the starboard position infrared light source 702 on the starboard side 312 as a same intensity.

Figure 8:
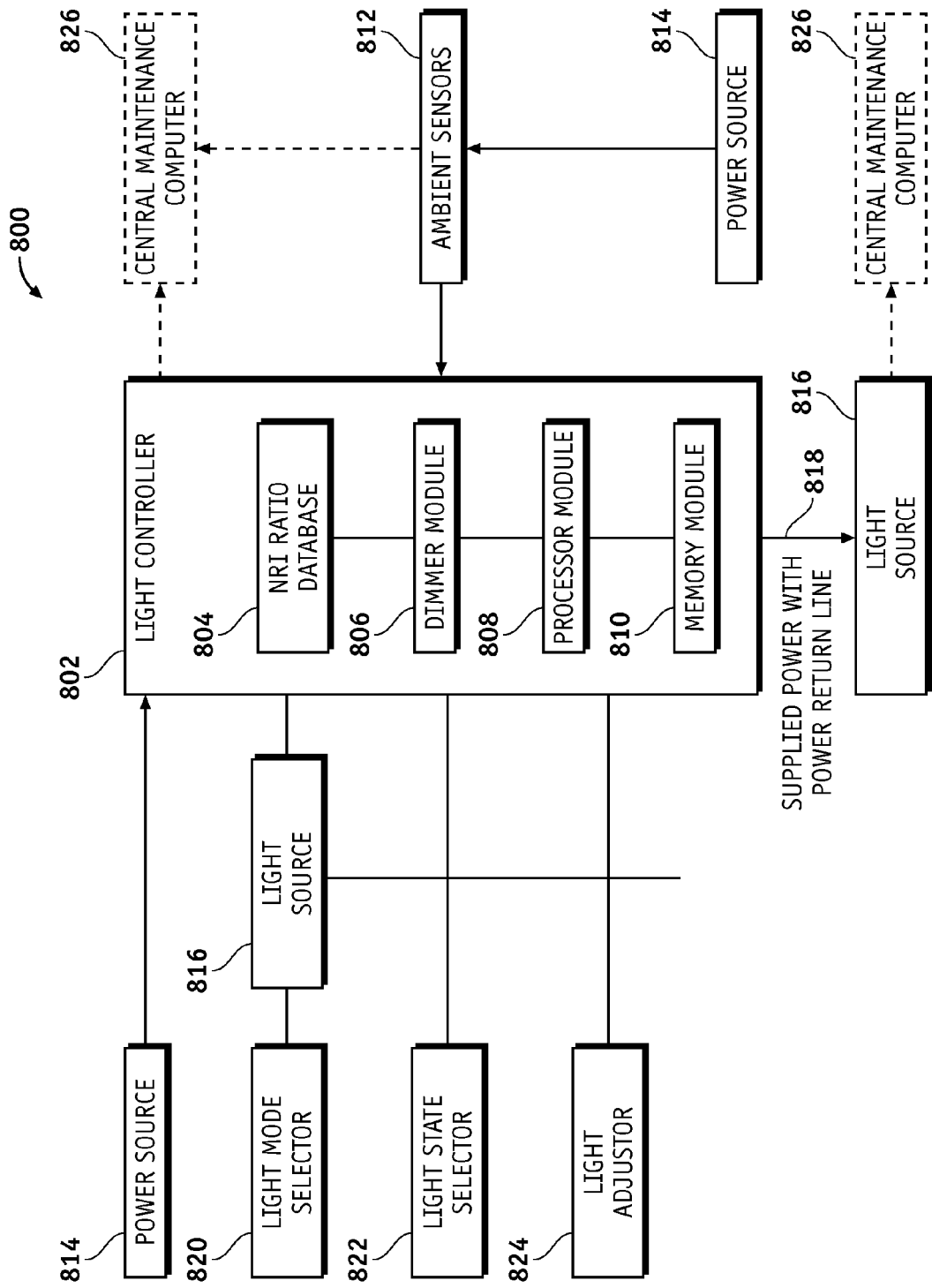
FIG. 8 is an illustration of an exemplary functional block diagram of a dual mode light automatic intensity control system according to an embodiment of the disclosure.

FIG. 8 is an illustration of an exemplary functional block diagram of a dual mode light automatic intensity control system (system 800) according to an embodiment of the disclosure. The system 800 may have functions, material, and structures that are similar to the FIGS. 1-7. Therefore common features, functions, and elements may not be redundantly described here. The system 800 may comprise a light controller 802, ambient sensors 812, a power source 814, a light source 816, a light mode selector 820, a light state selector 822, and a light adjustor 824. In some embodiments, the system 800 may comprise any number of processor modules, any number of memory modules, and any number of ambient sensors, any number of formation light sources, a certified arrangement of position lights, any number of power sources, any number of formation light controllers, and position light controllers. The illustrated system 800 depicts a simple embodiment for ease of description. These and other elements of the system 800 are interconnected together, allowing communication between the various elements of system 800.

The light controller 802, is configured to control (adjust) an infrared light radiation intensity on forward position infrared light sources and control (adjust) the infrared light radiation intensity of the forward starboard position infrared light source 704 to be less than a light radiation intensity of the forward port position infrared light source 706. Thereby enabling a pilot/operator in another aircraft/vehicle with night vision goggles to distinguish between the forward port position infrared light source 706 and the forward starboard position infrared light source 704. The light controller 802 is configured to control a dual mode feature of the light source 816 as well as balanced or controlled NVIS radiant intensity (NRI) values, including uniform dimming as explained below. The light controller 802 may be regulated by software. The light controller 802 may also adjust a light level of the light source 816 to compensate for a filtering effect of a windshield of an observer.

In operation, the light controller 802, operates the light source 816 at a first light level in a visible spectrum, and at a second light level in an infrared spectrum, and adjusts the second light level to substantially match the first light level when perceived through night vision goggles.

The light controller 802 comprises an NRI ratio database 804, a dimmer module 806, a processor module 808, and a memory module 810.

The NRI ratio database 804 comprises data such as NRI ratio values and/or NRI values. Visible light brightness is quantified as luminance and in terms of SI units is measured as candela/m². Luminance refers to a brightness/intensity of a lighted surface normal to a source of light. Luminance can either refer to the lighted surface at an origin of the source (e.g., an illuminated sign) or an illuminated surface of some other object. When IR light is viewed using NVGs, NRI can be used for measurement to account for the NVGs.

Units for NRI are generally watts/steradian and account for a radiometric energy of a light source integrated with a response curve of the NVGs. NRI values can be assigned to NVIS compatible visible light. Also, slight shifts (e.g., about 10 nm) in wavelength of NVIS compatible visible light (especially aviation red) will produce large shifts in NRI values. As such, control of binning of selected LEDs can be necessary if LEDs are used as a source of light. Also, within boundaries of aviation white, significant differences in NRI values can exist. If red, green and white LEDs are normalized to about 100 candelas, NRI values for red are much higher than green or white; and white NRI values are much higher than green. Even within "white" colors, a white color of temperature of about 2600 degrees K has a much higher NRI value than a white color of temperature of about 5000 degrees K. Thus, for two white NVIS Friendly lights to appear the same when observed with NVGs, color temperatures should be closely matched.

Hence, system 800 according an embodiment adjusts covert position light energy output of the dual mode light sources 702/704/706/708 to have substantially same NRI values as their visible counterparts such as light energy output of the dual mode light sources 502/504/506/508. In so doing, pilots/operators viewing IR adjusted forward position light energy output of forward starboard position infrared light source 704 and forward port position infrared light source 706 with NVGs will be able to distinguish between port and starboard position lights in the same manner as visible NVIS compatible position lights. Additionally, pilots/operators will be able to distinguish that two balanced IR position lights are in fact aft facing position lights and that an aircraft/vehicle they are observing is moving away.

A benefit of the embodiments is that pilots/operators that view visible position lights with NVGs will have substantially same NRI ratio values when viewing IR position lights with NVGs. An image a pilot/operator perceives will have a same relative brightness when viewed in a visible mode and in an IR mode. Reducing variables is important to pilots/operators operating under covert conditions and helps stabilize situational awareness. If the covert position light sources 702/704/706/708 comprise a variable intensity capability, then dimming of the covert position light sources 702/704/706/708 should be linear to maintain NRI differences.

The dimmer module 806 is configured to generate a dimming command to produce uniform dimming of one or more dual mode light sources such as the light sources 816.

The processor module 808 is configured to support a dual mode lights automatic intensity control method as described herein. For example but without limitation, the processor module 808 may be suitably configured to send a power adjustment value to the dimmer module 806, or other function of the system 800. Furthermore, the steps of a method or algorithm described in connection with the embodiments disclosed herein may be embodied directly in hardware, in firmware, in a software module executed by processor module 808, or in any practical combination thereof.

The processor module 808 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 810 may comprise a data storage area with memory formatted to support the operation of the system 800. The memory module 810 is configured to store, maintain, and provide data as needed to support the functionality of the system 800. For example but without limitation, the memory module 810 may store flight configuration data, an NRI ratio, an NRI value, or other data.

In some embodiments, the memory module 810 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 810 may be coupled to the processor module 808 and configured to store, for example but without limitation, a database, a computer program that is executed by the processor module 808, an operating system, an application program, tentative data used in executing a program, or other application. Additionally, the memory module 810 may represent a dynamically updating database containing a table for updating the database, and the like.

The memory module 810 may be coupled to the processor module 808 such that the processor module 808 can read information from and write information to the memory module 810. For example, the processor module 808 may access the memory module 810 to access an NRI ratio, an NRI value, or other data.

As an example, the processor module 808 and memory module 810 may reside in respective application specific integrated circuits (ASICs) or other programmable devices. The memory module 810 may also be integrated into the processor module 808. In an embodiment, the memory module 810 may comprise a cache memory for storing temporary variables or other intermediate information during execution of instructions to be executed by the processor module 808.

The ambient sensors 812 may comprise the port side ambient light sensor 412 configured to sense ambient light outboard and control the starboard dual mode formation light sources 402/404/406/408 on the starboard side 312, and the starboard side ambient light sensor 414 configured to sense ambient light outboard and control the port dual mode formation light sources 416/418/420/422 on the port side 310.

The ambient sensors 812 may also comprise the forward ambient light sensor 710 configured to sense ambient light forward and control aft facing dual mode position light sources 702/708, and the aft ambient light sensor 712 configured to sense ambient light aft and control forward facing dual mode position light sources 706/704.

The ambient sensors 812 sense an ambient light level of ambient light in a specific direction relative to the aircraft 400/700 to obtain a sensed ambient light level. Ambient light sensed by the ambient sensors 812 may comprise, for example but without limitation, natural light such as starlight, moonlight, and auroras, artificial light such as automotive light, street lights, and building light, sky glow (natural and/or artificial), or other ambient light that may be available in an environment.

The power source 814 is configured to supply power to the system 800 and adjust power output 818 of the light sources 816 based on the power adjustment value. The light sources 816 comprise formation light sources 402/404/406/408 and position light sources 702/704/706/708.

The system 800 may also comprise a central maintenance computer 826 to monitor health of the ambient sensors 812 and the light controller 802. The light controller 802 controls both formation light sources 402/404/406/408 and position light sources 702/704/706/708.

The light sources 816 may comprise the aft starboard position infrared light source 702, the forward starboard position infrared light source 704, the forward port position infrared light source 706, and the aft port position infrared light source 708. The light sources 816 may also comprise the starboard dual mode formation light sources 402/404/406/408 on the starboard side 312, and the port dual mode formation light sources 416/418/420/422 on the port side 310. The light sources 816, may comprise, example but without limitation, incandescent light sources, light emitting diodes sources, halogen light sources, or other type of infrared light source.

The light mode selector 820 is operable to select a visible light mode or a covert light mode of the light sources 816.

The light state selector 822 is operable to select an OFF or an ON state for the light sources 816.

The light adjustor 824 is operable to adjust the energy level of the light sources 816. The light adjustor 824 adjusts an energy level appropriate for the sensed ambient light level, and continuously adjusts the output energy level to a substantially optimal light level that substantially matches an ideal level that is compatible with night vision goggles. The substantially optimal light level for the night vision goggles may comprise, for example but without limitation, a light level that minimizes saturation of the night vision goggles, light level that enhances viewing of a runway through the night vision goggles, or other optimal light level for the night vision goggles. Furthermore, the substantially optimal light level for the night vision goggles may comprise, for example but without limitation, a substantially optimal light level for a particular type of night vision goggles, a substantially optimal light level for several types of night vision goggles, a calculated substantially optimal light level of general night vision goggles, a heuristic for substantially optimal light level of general night vision goggles, or other substantially optimal light level of night vision goggles.

Figure 9:
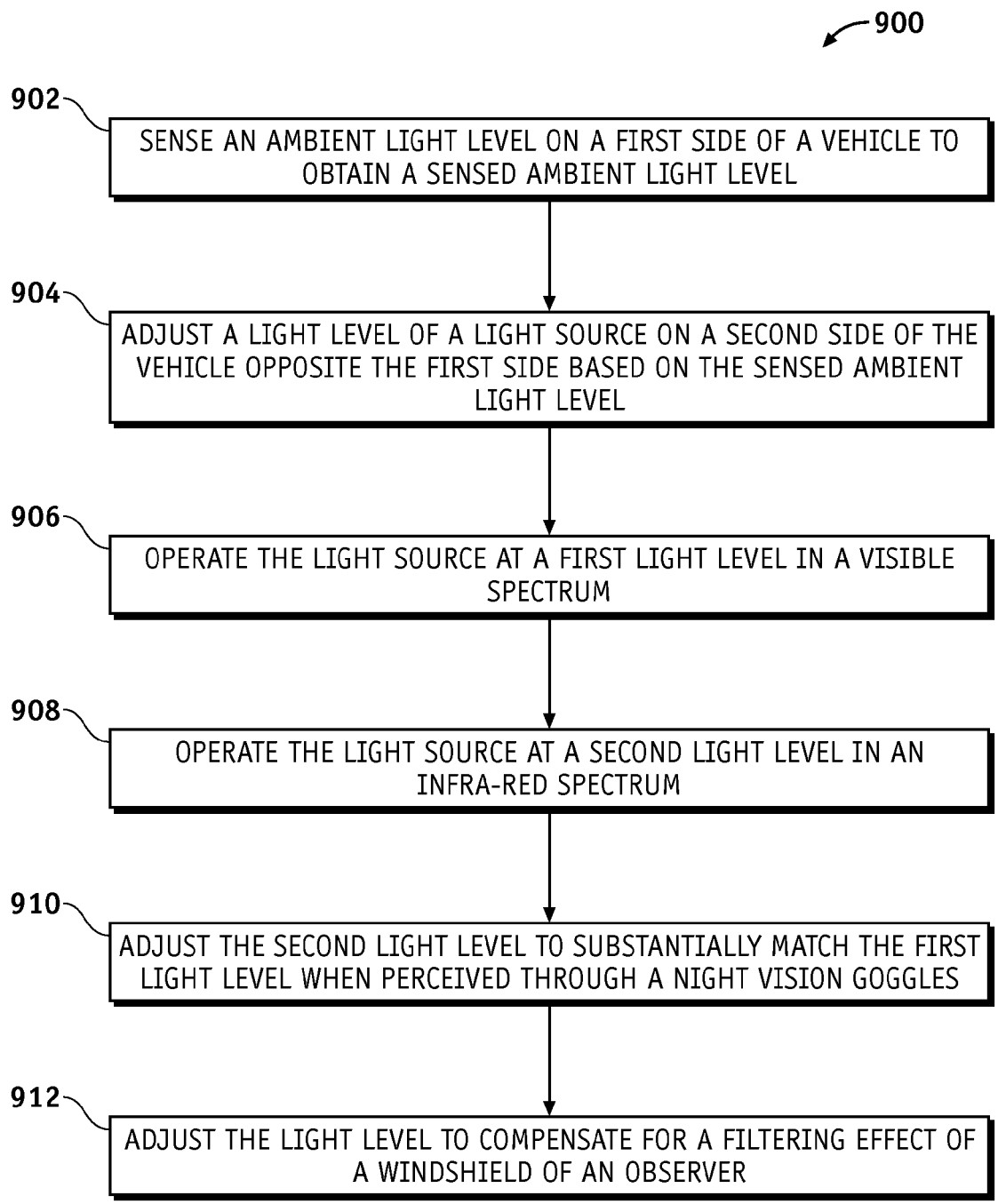
FIG. 9 is an illustration of an exemplary process of automatically adjusting intensity of a dual mode light according to an embodiment of the disclosure.

FIG. 9 is an illustration of an exemplary process of automatically adjusting intensity of a dual mode light source according to an embodiment of the disclosure. The various tasks performed in connection with process 900 may be performed mechanically, by software, hardware, firmware, computer-readable software, computer readable storage medium, or any combination thereof. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

For illustrative purposes, the following description of process 900 may refer to elements mentioned above in connection with FIGS. 1-8. In some embodiments, portions of the process 900 may be performed by different elements of the system 800 such as: the light controller 802, the ambient sensors 812, the power source 814, the light source 816, the light mode selector 820, the light state selector 822, the light adjustor 824, etc. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

Process 900 may begin by a sensor such as one of the ambient sensors 812 sensing an ambient light level on a first side of a vehicle such as the aircraft 400/700 to obtain a sensed ambient light level (task 902). The first side may comprise, for example but without limitation, the port side 310, the starboard side 312, a top side, a bottom side, a forward side, an aft side, or other side of the vehicle.

Process 900 may continue by a light controller such as the light controller 802 adjusting a light level of a light source such as the light source 816 on a second side of the vehicle opposite the first side based on the sensed ambient light level (task 904). For example but without limitation, the first side may comprise the port side 310 and the second side opposite of the first side may comprise the starboard side 312, or vice versa. Similarly, the first side may comprise the aft side and the second side opposite of the first side may comprise the forward side or vice versa, or other combination of opposite sides.

Process 900 may continue by the light controller 802 operating the light source 816 at a first light level in a visible spectrum (task 906).

Process 900 may continue by the light controller 802 operating the light source 816 at a second light level in an infrared spectrum (task 908).

Process 900 may continue by the light controller 802 adjusting the second light level to substantially match the first light level when perceived through a night vision goggles (task 910).

Process 900 may continue by the light controller 802 adjusting the second light level to compensate for a filtering effect of a windshield of an observer (task 912).

In this manner, embodiments of the disclosure allows trained pilots wearing NVGs to distinguish the direction of travel of remote covert aircraft that may be moving away or approaching.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 4 and 7-8 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, storage unit, or other non-transitory media. These and other forms of computer-readable media may be involved in storing one or more instructions for use by the processor module 808 to cause the processor module 808 to perform specified operations. Such instructions, generally referred to as "computer program code" or "program code" (which may be grouped in the form of computer programs or other groupings), when executed, enable the system 800.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for automatic intensity control of dual mode lights, the method comprising:
    sensing an ambient light level on a first side of a vehicle to obtain a sensed ambient light level;
    adjusting a light level of a light source on a second side opposite of the first side of the vehicle based on the sensed ambient light level;
    operating the light source at a first light level in a visible spectrum;
    operating the light source at a second light level in an infrared spectrum; and
    adjusting the second light level to substantially match the first light level when perceived through night vision goggles.

2. The method of claim 1, wherein the light source comprises one of: a position light source, and a formation light source.

3. The method of claim 1, further comprising adjusting the second light level to compensate for a filtering effect of a windshield of an observer.

4. The method of claim 1, wherein the vehicle comprises an aircraft and the light source is located on at least one of: a wing tip of the aircraft, and a fuselage of the aircraft.

5. A non-transitory computer readable storage medium comprising computer-executable instructions for automatic intensity control of dual mode lights, the computer-executable instructions comprising:
    sensing an ambient light level on a first side of a vehicle to obtain a sensed ambient light level; and
    adjusting a light level of a light source on a second side of the vehicle opposite the first side based on the sensed ambient light level, wherein the light source is located on at least one of: a wing tip of an aircraft, and a fuselage of an aircraft.

6. The non-transitory computer readable storage medium of claim 5, wherein the light source comprises one of: a position light source, and a formation light source.

7. The non-transitory computer readable storage medium of claim 6, the computer-executable instructions further comprising:
    operating the light source at a first light level in a visible spectrum;
    operating the light source at a second light level in an infrared spectrum; and
    adjusting the second light level to substantially match the first light level when perceived through night vision goggles.

8. The non-transitory computer readable storage medium of claim 5, further comprising adjusting the light level to compensate for a filtering effect of a windshield of an observer.

9. An automatic intensity control system for dual mode lights, the system comprising:
   at least one ambient light sensor coupled to a first side of a vehicle and operable to sense an ambient light level on the first side of the vehicle;
   at least one light source coupled to a second side of the vehicle opposite the first side and operable to transmit a light level adjusted based on the ambient light level; and
   a light controller operable to:
      operate the at least one light source at a first light level in a visible spectrum;
      operate the at least one light at a second light level in an infrared spectrum; and
      adjust the second light level to substantially match the first light level when perceived through night vision goggles.

10. The system of claim 9, wherein the at least one light source comprises one of: a position light source, and a formation light source.

11. The system of claim 9, wherein the light controller is further operable to adjust the light level to compensate for a filtering effect of a windshield of an observer.

12. The system of claim 9, wherein:
   an aft starboard position infrared light source and an aft port position infrared light source provide a substantially equal radiation intensity on wing tips of an aircraft;
   a forward starboard position infrared light source and a forward port position infrared light source are provided on the wing tips of the aircraft; and
   an infrared light radiation intensity of the forward starboard position infrared light source is adjusted to be less than a light radiation intensity of the forward port position infrared light source, enabling a pilot in another aircraft with the night vision goggles to distinguish between position infrared light sources on a port side and position infrared light sources on a starboard side.

13. The system of claim 12, wherein:
   the forward port position infrared light comprises a forward port night-vision-imaging-system radiant intensity (NRI) value;
   the forward starboard position infrared light source comprises a forward starboard NRI value;
   the aft port position infrared light source comprises an aft port NRI value;
   the aft starboard position infrared light source comprises an aft starboard NRI value;
   the forward port NRI value is substantially greater than the forward starboard NRI value;
   the aft port NRI value is substantially greater than the forward starboard NRI value and less than the forward port NRI value; and
   the aft starboard NRI value is substantially greater than the forward starboard NRI value and less than the forward port NRI value.

14. The system of claim 9, wherein the vehicle comprises an aircraft and the at least one light source is located on at least one of: a wing tip of the aircraft, and a fuselage of the aircraft.

15. A non-transitory computer readable storage medium comprising computer-executable instructions for automatic intensity control of dual mode lights, the computer-executable instructions comprising:
   sensing an ambient light level on a first side of a vehicle to obtain a sensed ambient light level;
   adjusting a light level of a light source on a second side of the vehicle opposite the first side based on the sensed ambient light level; and
   adjusting the light level to compensate for a filtering effect of a windshield of an observer.

16. The non-transitory computer readable storage medium of claim 15, wherein the light source comprises one of: a position light source, and a formation light source.

17. The non-transitory computer readable storage medium of claim 15, wherein the light source is located on at least one of: a wing tip of an aircraft, and a fuselage of an aircraft.

18. The non-transitory computer readable storage medium of claim 15, the computer-executable instructions further comprising:
   operating the light source at a first light level in a visible spectrum;
   operating the light source at a second light level in an infrared spectrum; and
   adjusting the second light level to substantially match the first light level when perceived through night vision goggles.

* * * * *